US011188681B2

(12) United States Patent
Cohen et al.

(10) Patent No.: US 11,188,681 B2
(45) Date of Patent: Nov. 30, 2021

(54) MALWARE RESISTANT COMPUTER

(71) Applicant: International Business Machines Corporation, Armonk, NY (US)

(72) Inventors: Guy M. Cohen, Ossining, NY (US); Shai Halevi, Elmsford, NY (US); Lior Horesh, North Salem, NY (US)

(73) Assignee: International Business Machines Corporation, Armonk, NY (US)

(*) Notice: Subject to any disclaimer, the term of this patent is extended or adjusted under 35 U.S.C. 154(b) by 167 days.

(21) Appl. No.: 16/377,839

(22) Filed: Apr. 8, 2019

(65) Prior Publication Data

US 2020/0320209 A1 Oct. 8, 2020

(51) Int. Cl.
*G06F 21/00* (2013.01)
*G06F 21/62* (2013.01)
*G06F 9/30* (2018.01)
*G06F 8/52* (2018.01)
*H04L 9/32* (2006.01)

(52) U.S. Cl.
CPC .............. *G06F 21/629* (2013.01); *G06F 8/52* (2013.01); *G06F 9/30145* (2013.01); *H04L 9/3278* (2013.01)

(58) Field of Classification Search
CPC ...... G06F 21/629; G06F 8/52; G06F 9/30145; H04L 9/3278
See application file for complete search history.

(56) References Cited

U.S. PATENT DOCUMENTS

| 5,610,981 | A | 3/1997 | Mooney | |
|---|---|---|---|---|
| 6,334,189 | B1 | 12/2001 | Granger | |
| 9,191,197 | B2* | 11/2015 | Hotta | H04L 9/0631 |
| 9,760,736 | B2 | 9/2017 | Clarke | |
| 9,842,212 | B2 | 12/2017 | Oxford | |
| 10,049,057 | B2* | 8/2018 | Desai | G06F 12/1009 |
| 10,291,414 | B1 | 5/2019 | Leobandung | |
| 2003/0056088 | A1* | 3/2003 | Heishi | G06F 9/30072 712/214 |
| 2004/0081011 | A1* | 4/2004 | Maruyama | G11C 11/40611 365/233.1 |
| 2006/0259900 | A1 | 11/2006 | Vernon | |
| 2014/0318772 | A1* | 10/2014 | Boyd | E21B 21/067 166/267 |
| 2014/0351584 | A1* | 11/2014 | Checcucci | H04L 63/0428 713/164 |

(Continued)

OTHER PUBLICATIONS

U. Tietze, "Advanced Electronic Circuits", 1978, Springer-Verlag Berlin, pp. 256-291 (Year: 1978).*

(Continued)

*Primary Examiner* — Joseph P Hirl
*Assistant Examiner* — Chi D Nguy
(74) *Attorney, Agent, or Firm* — VanLeeuwen & VanLeeuwen; Jeffrey S. LaBaw

(57) ABSTRACT

An approach is provided in which an information handling system loads a set of encrypted binary code into a processor that has been encrypted based upon a unique key of the processor. The processor includes an instruction decoder that transforms the set of encrypted binary code into a set of instruction control signals using the unique key. In turn, the processor executes a set of instructions based on the set of instruction control signals.

14 Claims, 10 Drawing Sheets

(56) References Cited

U.S. PATENT DOCUMENTS

| | | | |
|---|---|---|---|
| 2016/0094555 A1* | 3/2016 | Kiperberg | G06F 12/1408 |
| | | | 713/190 |
| 2016/0380772 A1* | 12/2016 | Gopal | H04L 9/0643 |
| | | | 713/170 |
| 2017/0161069 A1* | 6/2017 | Yokota | G06F 9/30018 |
| 2018/0278418 A1* | 9/2018 | Chang | H04L 9/0869 |
| 2019/0102338 A1* | 4/2019 | Tang | G06F 9/3802 |
| 2019/0182054 A1 | 6/2019 | Leobandung | |

OTHER PUBLICATIONS

Frank Vater "Combinatorial logic circuitry as means to protect low cost devices against side channel attacks", 2007, Innovations for High Performance, pp. 1-14 (Year: 2007).*

Abmuth et al., "Improving Resilience by Deploying Permuted Code onto Physically Unclonable Unique Processors," IEEE 2016 Cybersecurity and Cyberforensics Conference (CCC), Aug. 2016, Amman, Jordan, 7 pages.

Blazytko et al., "Syntia: Breaking State-of-the-Art Binary Code Obfuscation Via Program Synthesis," Ruhr-Universitat, Bochum, Germany, 2018, 31 pages.

Sinha et al., "Reviving Instruction Set Randomization," 2017 IEEE International Symposium on Hardware Oriented Security and Trust (HOST), May 2017, McClean, VA, 8 pages.

Siddiqui et al., "Hardware based protection against Malwares by PUF based access control Mechanism," 2017 IEEE 60th International Midwest Symposium on Circuits and Systems (MWSCAS), Oct. 2017, Boston, MA, 4 pages.

* cited by examiner

MALWARE RESISTANT COMPUTER

BACKGROUND

Malware is malicious software intentionally designed to exploit a computer, server, client, or computer network. Malware takes the form of executable code, scripts, active content, and other software to exploit a computer after it is installed on the computer. Malware is typically described as a computer virus, worm, Trojan horse, ransomware, spyware, adware, and etcetera. A malware's purpose may be to damage a computer, use the computer to perform a denial of service attack, and/or mine cryptocurrency without the computer owner's permission.

The best-known types of malware, viruses and worms, are known for the manner in which they spread, rather than any specific types of behavior. A computer virus is software that embeds itself in some other executable software (including the operating system itself) on the target system without the user's knowledge and consent and when it is run, the virus is spread to other executables. A worm is stand-alone malware software that actively transmits itself over a network to infect other computers. A virus spreads when a user runs an infected software or operating system, whereas a worm spreads itself. Malware binary code is an executable (ready-to-run) malicious program that is often given a file name extension of ".bin" or ".exe". Regardless of the type of malware, malware has the ability to spread rapidly over a computer network and cause havoc on computer systems on the computer network.

BRIEF SUMMARY

According to one embodiment of the present disclosure, an approach is provided in which an information handling system loads a set of encrypted binary code into a processor that has been encrypted based upon a unique key of the processor. The processor includes an instruction decoder that transforms the set of encrypted binary code into a set of instruction control signals using the unique key. In turn, the processor executes a set of instructions based on the set of instruction control signals.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
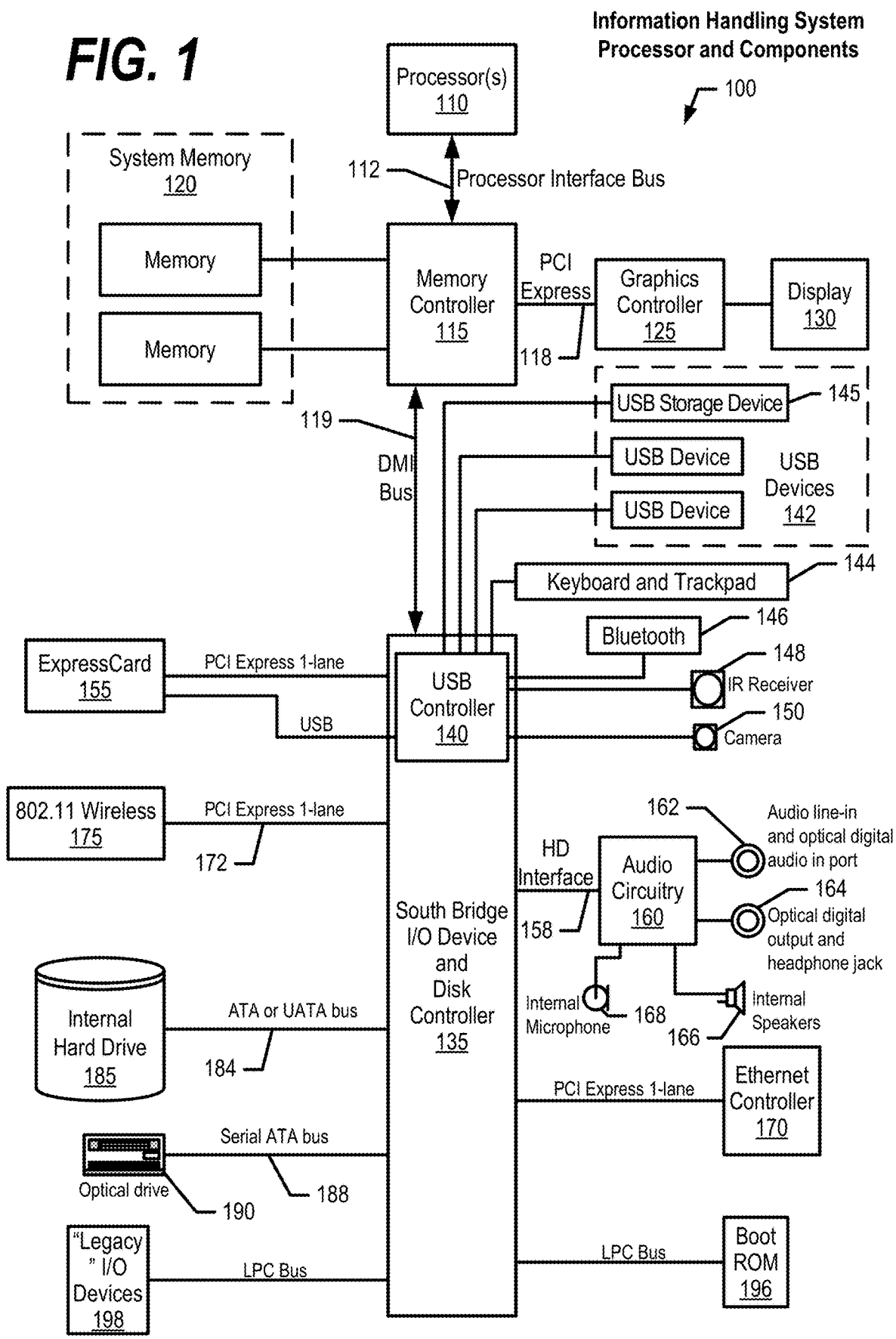
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. In one embodiment, as described in detail below, for systems with multiple processors, each processor uses a unique key to decrypt its own unique binary code. In another embodiment, the system's processors may share the same unique key. In yet another embodiment, with one processor that includes multiple cores, the multi-core processor uses one unique key for all of its processors.

Processor interface bus 112 connects processors 110 to memory controller 115, which is also known as the Memory Controller Hub (MCH). Memory controller 115 connects to system memory 120 and provides a means for processor(s) 110 to access the system memory. Graphics controller 125 also connects to memory controller 115. In one embodiment, Peripheral Component Interconnect (PCI) Express bus 118 connects memory controller 115 to graphics controller 125. Graphics controller 125 connects to display device 130, such as a computer monitor.

Memory controller 115 and Southbridge 135 connect to each other using bus 119. In some embodiments, the bus is a Direct Media Interface (DMI) bus that transfers data at high speeds in each direction between memory controller 115 and Southbridge 135. In some embodiments, a PCI bus connects the Memory controller and the Southbridge. Southbridge 135, also known as the Input/Output (I/O) Controller Hub (ICH) is a chip that generally implements capabilities that operate at slower speeds than the capabilities provided by the Memory controller. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
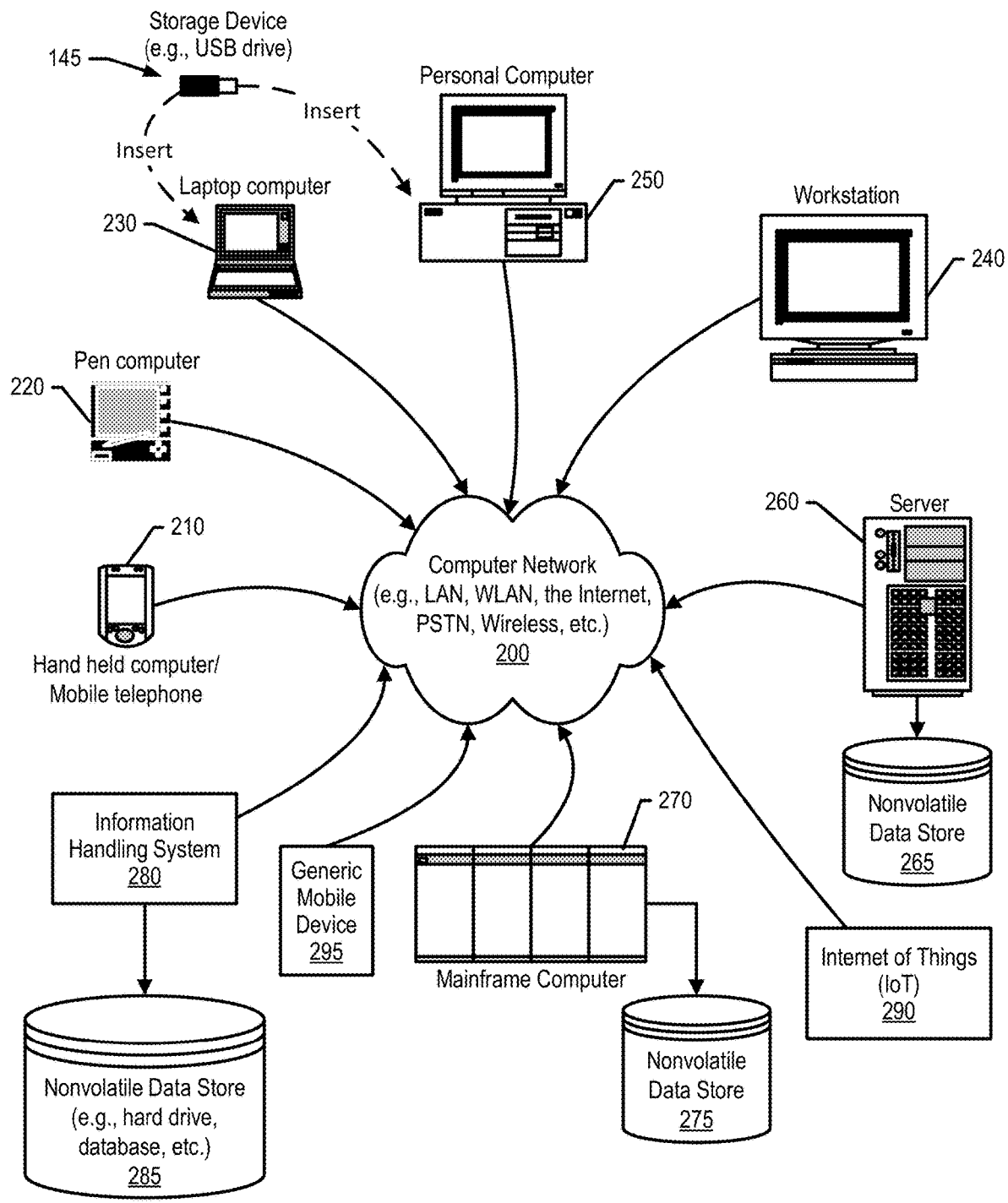
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, server 260, Internet of Things (IoT) 290, and generic mobile device 295. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 10 depict an approach that inhibits malware from maliciously exploiting computers in a computer network. As discussed herein, a software manufacturer uses a processor-specific unique key to encrypt common assembly code into unique binary code and send the unique binary code to a processor, also referred to herein as a set of encrypted binary code. The processor, in turn uses a customized instruction decoder to transform the unique binary code into instruction control signals based on the processor's unique key. If the unique binary code includes malware and propagates to other computer systems, the malware is not executable by the other computer systems because the other processors have different unique keys.

As discussed in detail herein, the approach has several advantages over prior approaches by implementing a direct transformation from unique binary code to instruction control signals. First, the approach described herein does not require overhead in execution time to run the unique binary code. In prior approaches, the encrypted binary code is decrypted before it is executed by a processor, thus utilizing processing overhead that consumes resources and power. Second, the approach described herein does not store decrypted binary code in memory during the transformation process. Prior approaches decrypt encrypted binary code and store the decrypted binary code in a memory area that can propagate and infect other computer systems.

Figure 3:
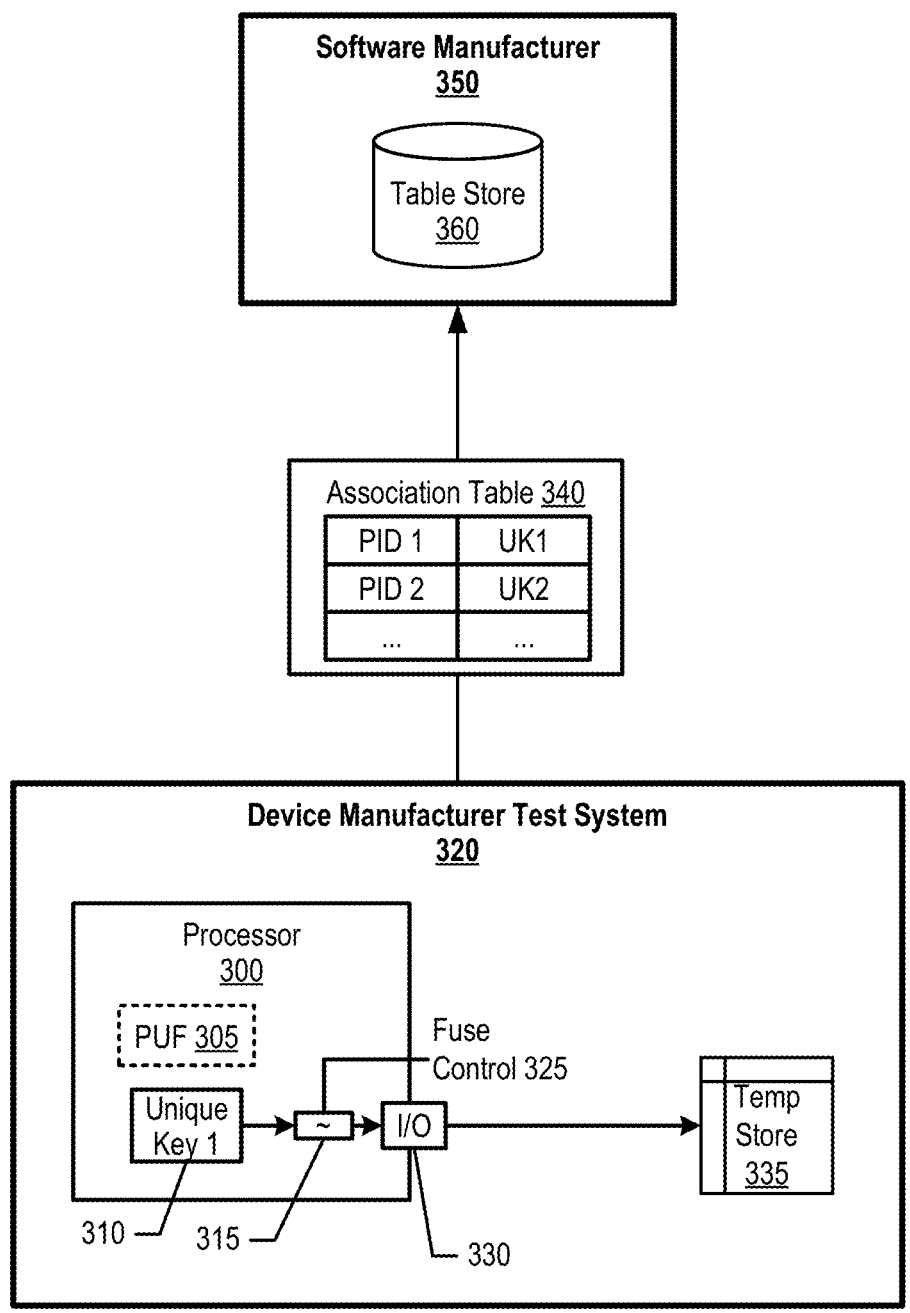
FIG. 3 is an exemplary diagram depicting a device manufacturer test system sending an association table to a software manufacturer that associates processor identifiers to embedded unique keys.

FIG. 3 is an exemplary diagram depicting a device manufacturer test system sending an association table to a software manufacturer that associates processor identifiers to embedded unique keys. Device manufacturer test system 320 tests processor 300 and, in one embodiment, device manufacturer test system 320 reads out unique key 1 310 from processor 300 via I/O port 330.

In one embodiment, processor 300 uses a Physical Unclonable Function (PUF) 305 to generate unique key 1 310. Processor 300 includes circuitry (e.g., a memory) and, due to variations in the fabrication of similar devices, two nominally identical circuits by design will function differently at power-up. For example, circuit layout ground rules of a CMOS process typically define a minimum critical dimension (CD) for the field effect transistor gate length. If a memory circuit such as static random access memory (SRAM) is drawn using transistors that uses the minimum CD, due to process variations (e.g. line width uniformity across the wafer) some transistors in the circuit will have a stronger current drive than other transistors in the same physical circuit.

As a result, when power is applied to the SRAM some of the bits in the memory will set to "1" while others will set to "0". Because of this phenomenon, two identical SRAMs by design will have different memory content on power-up. While the bit pattern of "1" and "0" upon power up will be reproducible for a given processor, the pattern is not predictable without access to the processor itself and varies from one processor to another of the same processor type. As a result, each processor generates a unique key from the PUF at power-up despite the fact that all processors of the same processor type have the same circuits and manufactured using the same CMOS process. Device manufacturer test system 320 reads out unique key 1 310 and stores unique key 1 310 and processor 300's unique identifier (e.g., serial number) in temp store 335.

In another embodiment, device manufacturer test system 320 uses a pseudo random generator to generate unique key 1 310 and stores unique key 1 310 via I/O port 330 into processor 300. In either embodiment discussed above, device manufacturer test system 320 blows fuse 315 via fuse control 325 to inhibit unique key 1 310 from being retrieved by, for example, malicious users or a malicious program. In turn, device manufacturer test system 320 sends processor identifier/unique key associations via association table 340 to software manufacturer 350, which software manufacturer stores in table store 360. As discussed below, software manufacturer 350 uses the processor identifier/unique key associations to generate unique binary code for use by processors that are installed in computer systems.

Figure 4:
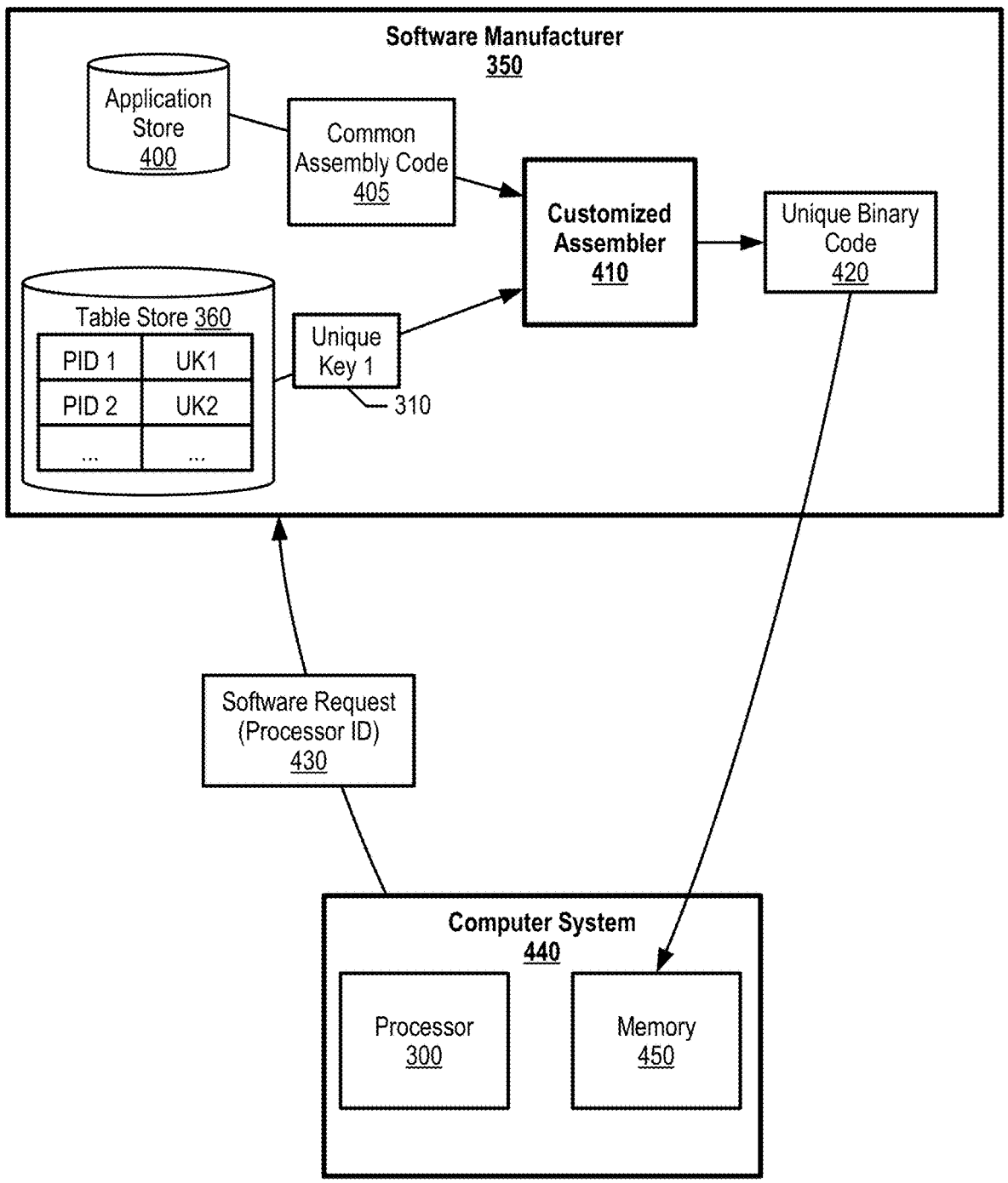
FIG. 4 is an exemplary diagram depicting a software manufacturer receiving a request from a computer system and generating unique binary code for a processor utilized by the computer system.

FIG. 4 is an exemplary diagram depicting a software manufacturer receiving a request from a computer system and generating unique binary code for a processor utilized by the computer system. Computer system 440 sends software request 430 to software manufacturer 350 that requests a software application and includes processor 300's unique identifier (e.g., serial number).

Software manufacturer 350 receives request 430 and accesses table store 360 to identify a unique key (unique key 1 310) associated with the processor identifier included in software request 430. Next, software manufacturer 350 retrieves assembly code 405 from application store 400 corresponding to the requested application. Common assembly code 405 (e.g. ADD, MOV, CMP, JMP, etc.) is identical for all processors of a given processor type (e.g., x86).

Software manufacturer 350 uses customized assembler 410 to generate unique binary code 420 using common assembly code 405 and unique key 1 310. Unique binary code 420 is different from native binary code (includes native binary code instructions) typically generated from common assembly code 405 in that all processors of a specific processor type are able to utilize the native binary code (e.g., all x86 based processors), whereas only processor 300 is able to properly transform unique binary code 420 into instruction control signals (see FIGS. 5, 6, 9, and corresponding text for further details). For example, processor 300's MOV instruction is represented by a unique binary code line of "0010 1100", but another processor of the same processor type will have a MOV instruction represented by a unique binary code line of "0110 0011" because processor 300 and the other processor have different unique keys. As a result, when processor 300 is infected by malware, the malware does not simply transfer to the other processor's computer as a binary executable since unique binary code 420 is not executable on the other processor.

In one embodiment, customized assembler 410 selects between a number of different valid instruction codes to represent a particular instruction to ensure an equal probability of appearance so a malicious user cannot determine the resulting unique binary code based on historical information (e.g., 60% of all instructions are typically MOV instructions). For example, common assembly code 405 includes a MOV instruction and customized assembler 410 allows four different native binary codes to represent the MOV instruction and be encrypted by unique key 1 310. In this embodiment, customized assembler 410 selects one of the four native binary codes to ensure that the resulting four valid unique binary code lines are evenly utilized within unique binary code 420 (see FIG. 8 and corresponding text for further details).

When software manufacturer 350 finishes generating unique binary code 420, software manufacturer 350 sends unique binary code 420 to computer system 440, which computer system 440 stores in memory 450 that processor 300 subsequently transforms and executes (see FIGS. 6, 9, and corresponding text for further details).

In one embodiment, a workstation having multiple processors stores multiple different copies of binary codes of the same program if a program is distributed among the various processors. However, a processor with multiple cores may share the same unique key so only one binary code is needed.

Figure 5:
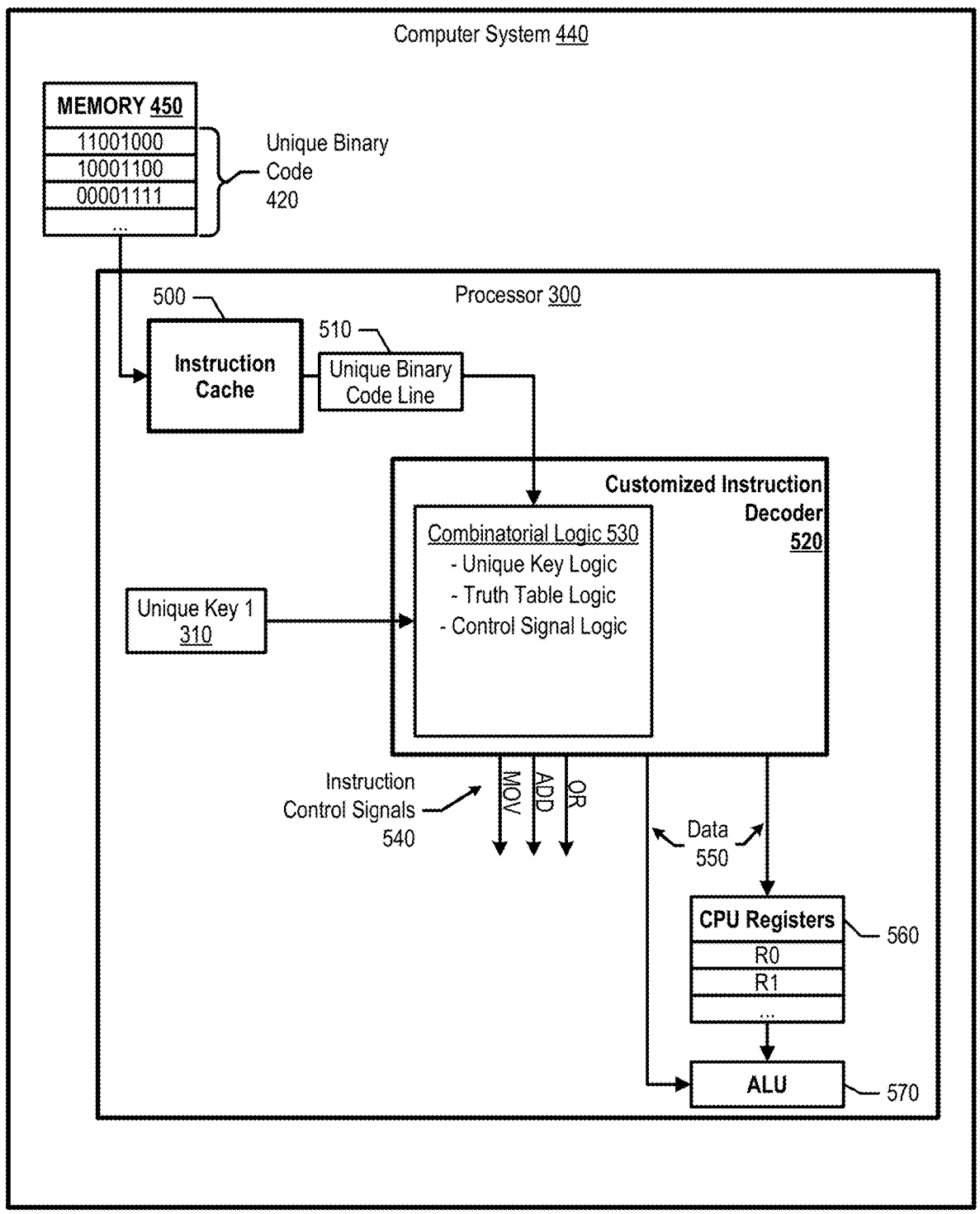
FIG. 5 is an exemplary diagram depicting a processor using customized combinatorial logic as an instruction decoder to transform unique binary code into instruction control signals and data using a unique key.

FIG. 5 is an exemplary diagram depicting a processor using customized combinatorial logic as an instruction decoder to transform unique binary code into instruction control signals and data using a unique key.

Computer system 440 receives unique binary code 420 from software manufacturer 350 and stores the code in memory 450. Processor 300 includes instruction cache 550, which retrieves unique binary code 420 and feeds lines of unique binary code 420 to customized instruction decoder 520 (unique binary code line 510). Unique binary code line 510 is still encrypted as it feeds into customized instruction decoder 520. In one embodiment, processor 300 does not use instruction cache 500 as a staging area for unique binary code 420, but instead feeds unique binary code 420 to customized instruction decoder 520.

Customized instruction decoder 520 uses unique key 1 310, which is part of the processor and is not accessible from outside the processor, and uses unique binary code line 510 as inputs into combinatorial logic 530, which includes unique key logic, truth table logic, and control signal logic to produce output control signals 540 and data 550. Output control signals 540 are based on a native instruction (ADD, MOV, etc.) corresponding to unique binary code line 510. Data 550 is based on data stored in CPU registers and/or ALU 570 corresponding to unique binary code line 510.

As can be seen, nowhere does processor decode unique binary code line 510 into native binary code and store the native binary code, but instead uses customized instruction decoder 520 to transform unique binary code line 510 into instruction control signals and data. As a result, processor 300 never stores decoded native binary code in memory.

Figure 6:
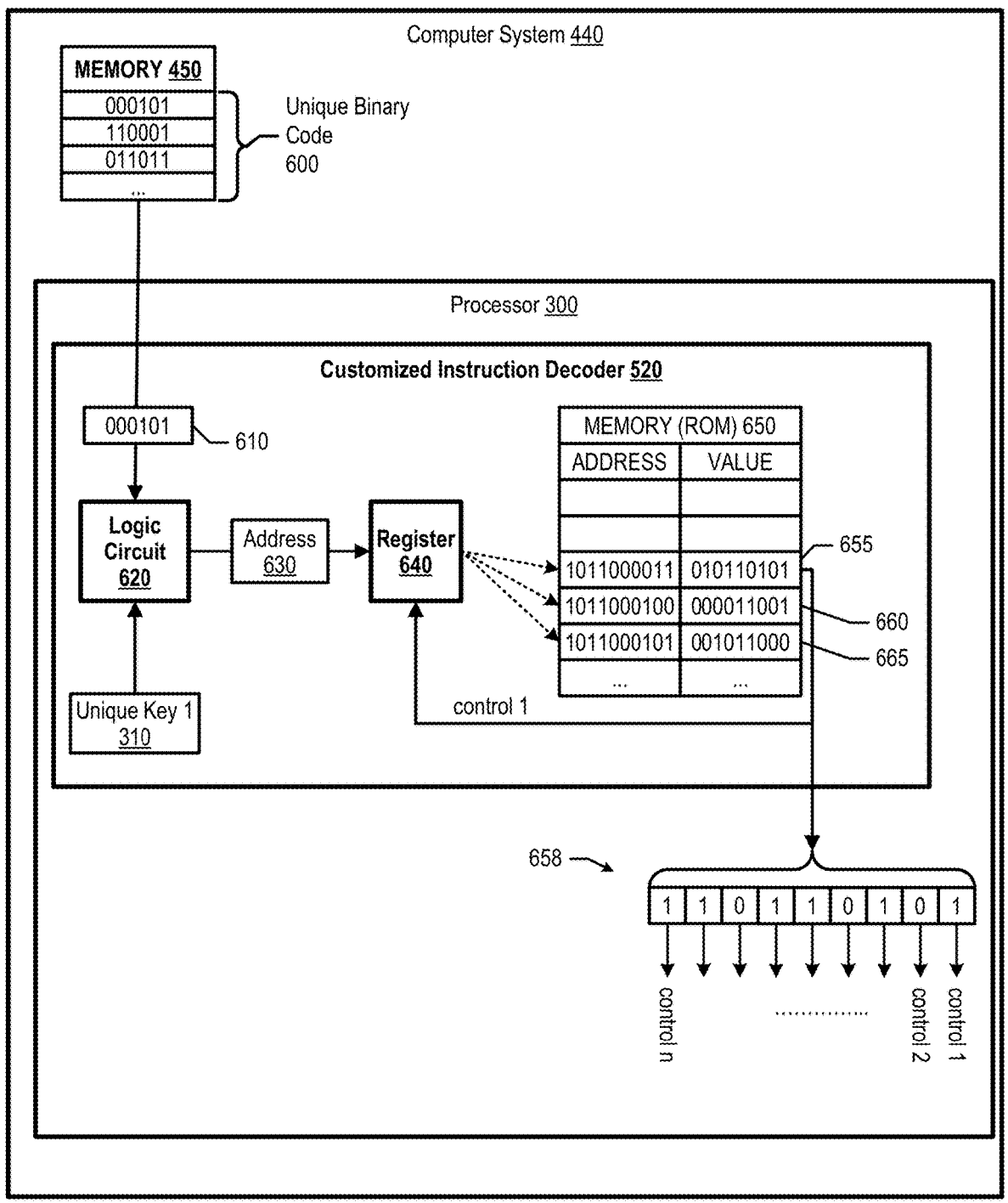
FIG. 6 is an exemplary diagram depicting a processor using a read only memory as an instruction decoder to transform unique binary code into instruction control signals and data using a unique key.

FIG. 6 is an exemplary diagram depicting a complex instruction set processor or a reduced instruction set processor using a read only memory (ROM) as an instruction decoder to transform unique binary code into instruction control signals and data using a unique key. Unique binary code instruction 610 is part of unique binary code 600 and feeds into logic circuit 620. Logic circuit 620 also receives unique key 1 310 as an input and produces address 630 as an output that is latched into register 640.

At address 630 ("1011000011"), memory 650 stores value 655, which transform into control signals 658 and are used to execute a binary instruction corresponding to unique binary code instruction 610. In one embodiment, when the corresponding binary instruction is a complex instruction, address 630 points to the beginning of a block of control signals that are issued sequentially (e.g., on each clock cycle). In the example shown in FIG. 6, control signal 1 serves as a control line into register 640. When control signal 1's bit is set to "1" the address register content is incremented by one every clock cycle in register 640. Because value 655's control signal 1 bit is "1," register 640 increases address "1011000011" to "1011000100" after one clock cycle. Value 660's control signal 1 bit is also "1" and, as such, register 640 increases address "1011000100" to "1011000101." Since address "1011000101" includes value 665 of "001011000," control signal 1's bit is now "0", which leads to customized instruction decoder 520 loading a new address into register 640 from the next unique binary code line (e.g. "110001" from unique binary code 600 is loaded into logic circuit 620 to generate a new address 630).

Figure 7:
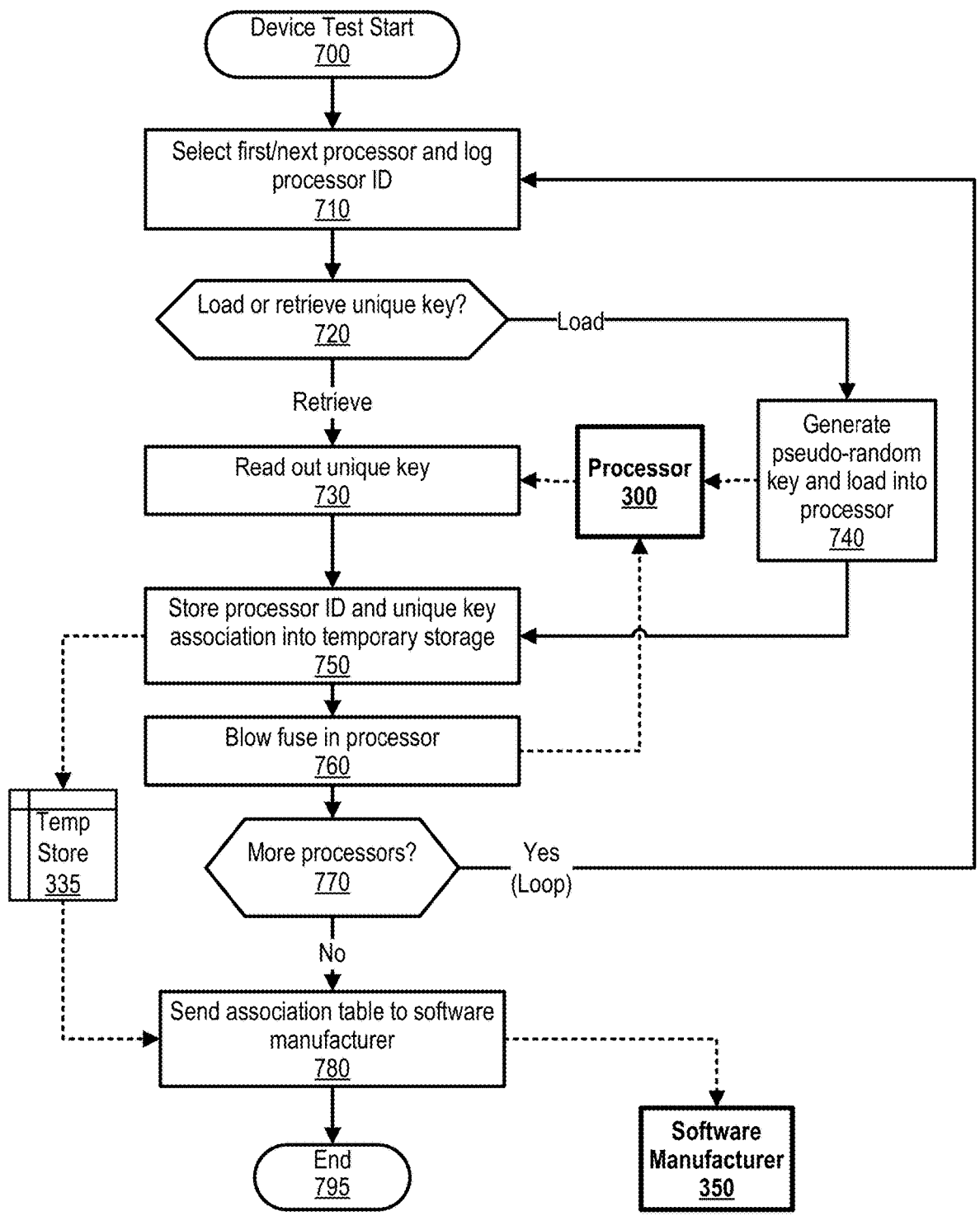
FIG. 7 is an exemplary flowchart showing steps taken by a device manufacturer to generate a processor identifier/unique key association table and send the association table to a software manufacturer.

FIG. 7 is an exemplary flowchart showing steps taken by a device manufacturer to generate a processor identifier/unique key association table and send the association table to a software manufacturer. FIG. 7 processing commences at 700 whereupon, at step 710, the process selects the first processor and logs the selected processor's identifier (e.g., serial number).

The process determines as to whether to load a unique key (e.g., load an encryption key, public/private key, etc.) into the device or retrieve a unique key from the device (e.g., from a PUF) (decision 720). In one embodiment, decision 720 is predetermined by the manufacturer. If the process should retrieve the unique key from processor 300, decision 720 branches to the 'retrieve' branch whereupon, at step 730, the process reads out the unique key from processor 300. On the other hand, if the process should load a unique key (key combination) into the selected processor, then decision 720 branches to the 'load' branch whereupon, at step 740, the process generates a pseudo-random key or public key/private key and loads the pseudo-random key into the processor.

At step 750, the process stores the processor ID and unique key association into temporary store 335 and, at step 760, the process blows a fuse (e.g., fuse 315) in processor 300 to prevent the unique key (key combination) from being extracted from processor 300.

The process determines as to whether there are more processors to process (decision 770). If there are more processors to process, then decision 770 branches to the 'yes' branch which loops back to select and process the next processor. This looping continues until there are no more processors to process, at which point decision 770 branches to the 'no' branch exiting the loop. At step 780, the process sends the association table from temporary store 335 to software manufacturer 350 and FIG. 7 processing thereafter ends at 795.

Figure 8:
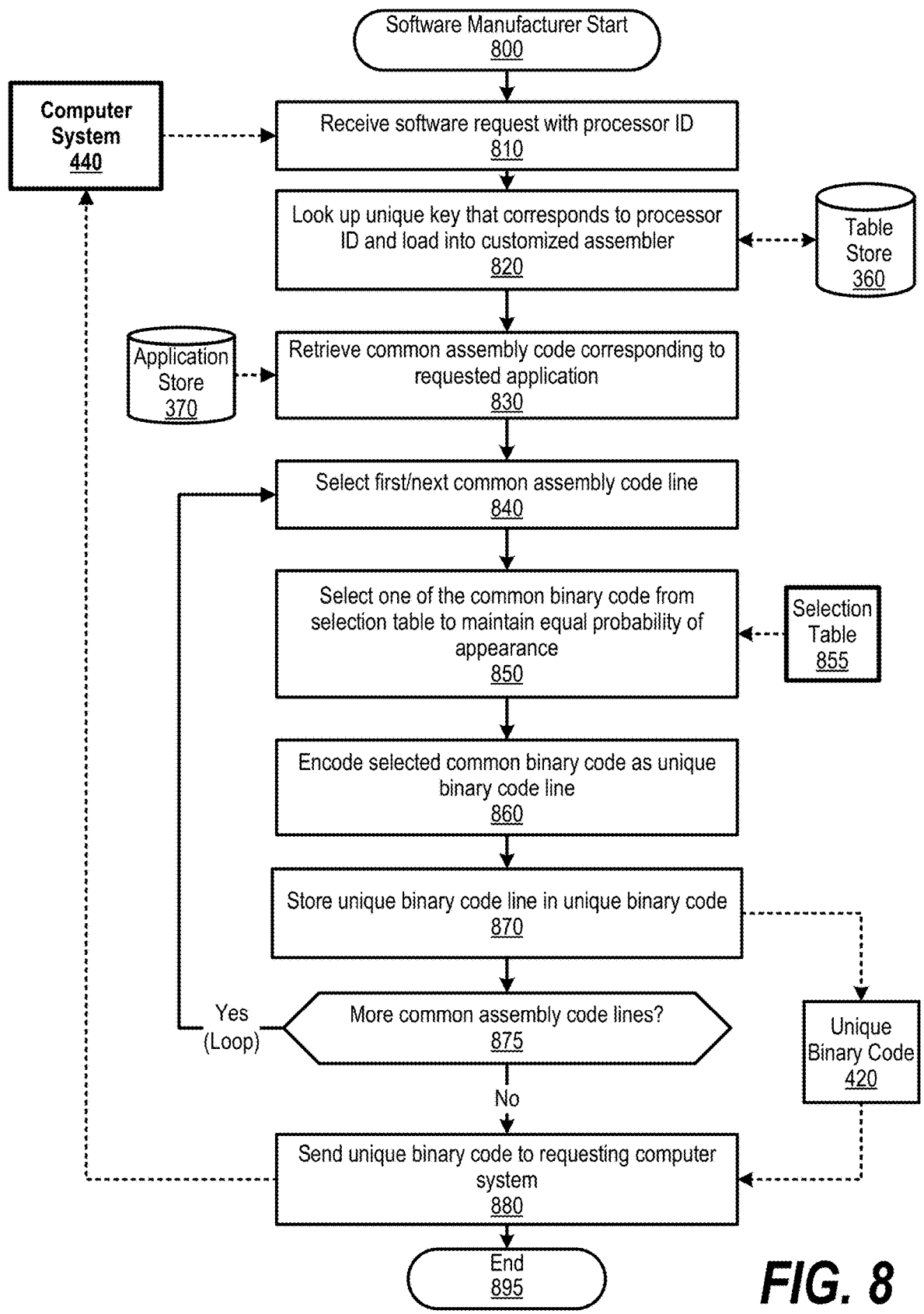
FIG. 8 is an exemplary flowchart depicting steps taken by a software manufacturer to generate unique binary code using common assembly code and a unique key corresponding to a processor.

FIG. 8 is an exemplary flowchart depicting steps taken by a software manufacturer to generate unique binary code using common assembly code and a unique key corresponding to a processor. FIG. 8 processing commences at 800 whereupon, at step 810, the process receives a software request from computer system 440 that includes a processor ID and requests a software application.

At step 820, the process looks up a unique key in the association table stored in table store 360 that corresponds to the processor ID and loads the unique key into customized assembler 410. At step 830, the process retrieves common assembly code 405 from application store 370 corresponding to the requested application. At step 840, the process selects the first assembly code line in the common assembly code and, at step 850, the process selects one of the native binary code lines from selection table 855 corresponding to the common assembly code line to maintain an equal probability of appearance (see FIG. 4 and corresponding text for further details). At step 860, the process encrypts the selected native binary code to generate a unique binary code line. At step 870, the process stores the unique binary code line in unique binary code 420.

The process determines as to whether there are more common assembly code lines left in the common assembly code to process (decision 875). If there are more common assembly code lines to process, decision 875 branches to the "yes" loop, which loops back to select and process the next common assembly code line. This looping continues until there are no more common assembly code lines to process, at which point decision 875 branches to the 'no' branch.

Figure 9:
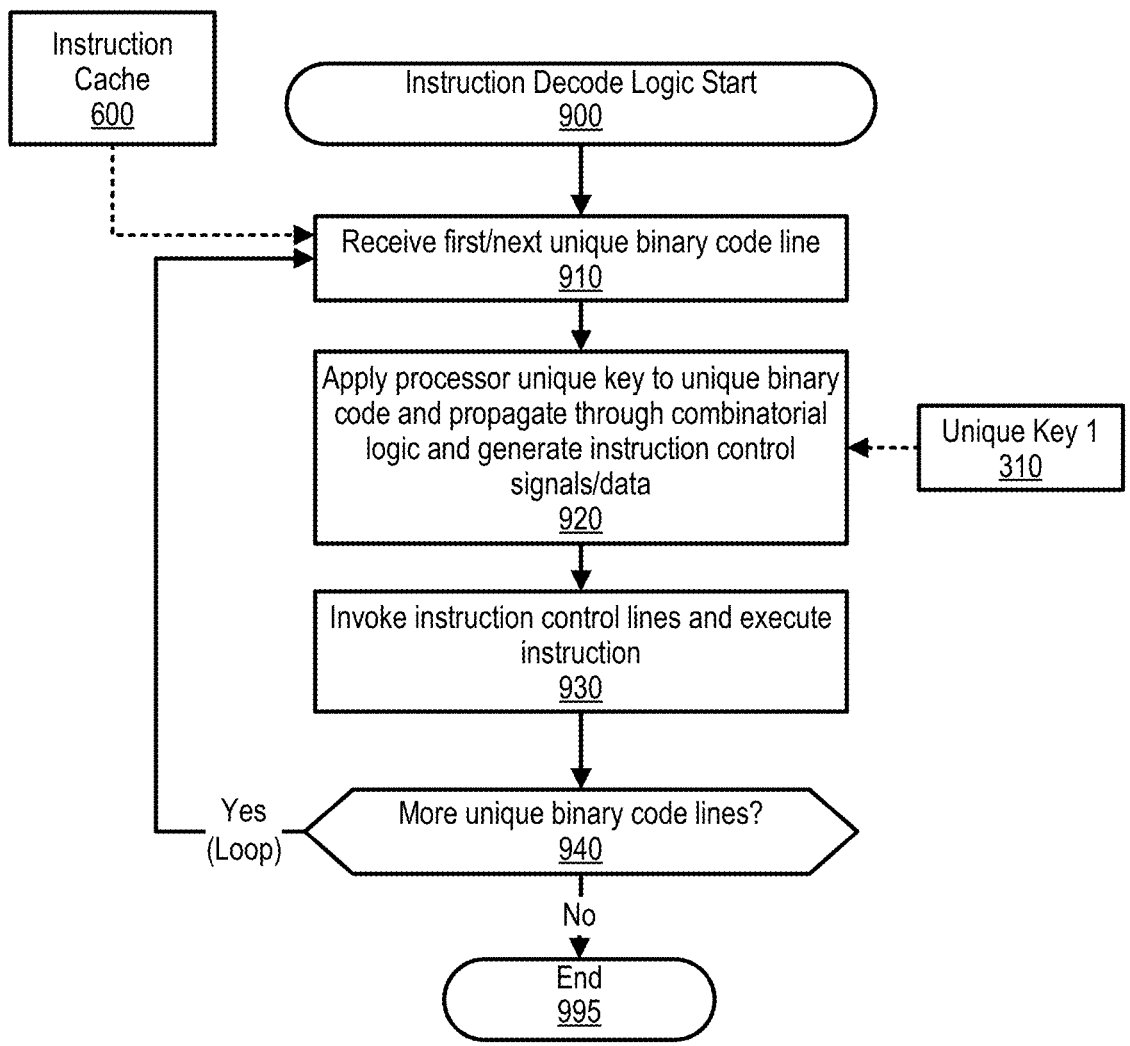
FIG. 9 is an exemplary flowchart showing steps taken by instruction decode logic to execute unique binary code.

At step 880, the process sends unique binary code 420 to requesting computer system 440, which computer system 440 executes using a customized instruction decoder (see FIGS. 6, 9, and corresponding text for further details). FIG. 8 processing thereafter ends at 895.

FIG. 9 is an exemplary flowchart showing steps taken by instruction decode logic to execute unique binary code. Processing commences at 900 whereupon, at step 910, the instruction decoder receives a first unique binary code line from instruction cache 600. At step 920, the instruction decode logic applies unique key 1 310 to unique binary code and propagates through the instruction decode combinatorial logic to generate instruction control signals/data. At step 930, the process invokes instruction control lines based on the truth table logic output. In one embodiment as discussed herein, the process uses a read only memory as an instruction decoder to generate the appropriate instruction decode signals (see FIG. 6 and corresponding text for further details).

A determination is made as to whether there are more unique binary code lines to process (decision 940). If there are more unique binary code lines to process, decision 940 branches to the 'yes' branch, which loops back to process the next unique binary code line. This looping continues until there are no more unique binary code lines to process, at which point decision 940 branches to the 'no' branch. FIG. 9 processing thereafter ends at 995.

Figure 10:
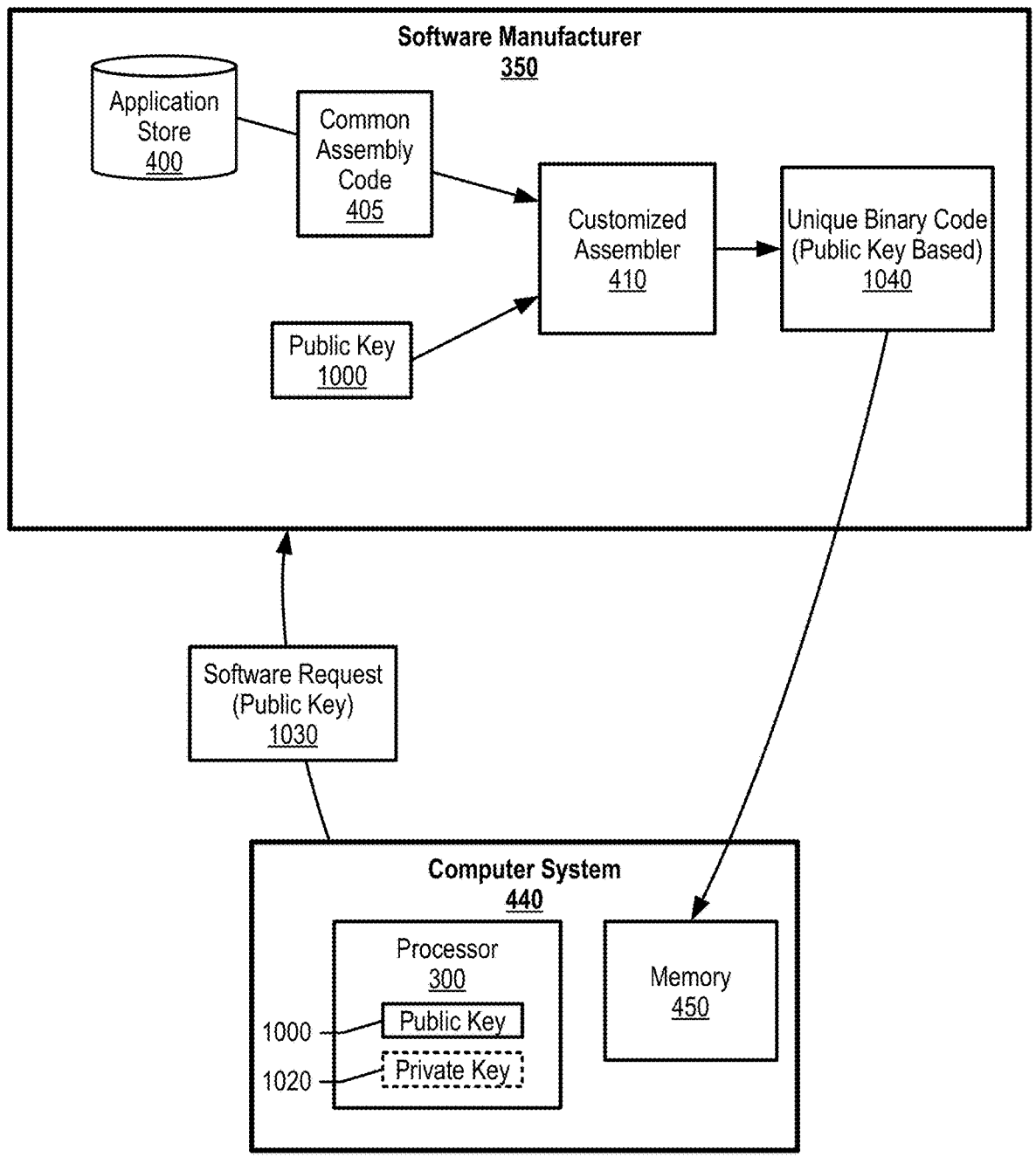
FIG. 10 is an exemplary diagram depicting an embodiment that utilizes a public key/private key approach to generate unique binary code and transform the unique binary code to instruction control signals.

FIG. 10 is an exemplary diagram depicting an embodiment that utilizes a public key/private key approach to generate unique binary code and transform the unique binary code to instruction control signals. FIG. 10 is similar to FIG. 4 with the exception that computer system 440's processor 300 stores public key 1000 and private key 1020. Public key 1020 is externally accessible but private key 1020 is not externally accessible, similar to unique key 1 310 discussed herein. As those skilled in the art can appreciate, public key 1000 is used by outside entities to encrypt data, but only private key 1020 can be used to decrypt the data.

In the embodiment shown in FIG. 10, computer system 440 sends software request 1030 to software manufacturer 350. Software request 1030 includes public key 1000, which does not require security because it is a public key. Software manufacturer 350 uses public key 1000 in customized assembler 410 to generate unique binary code 1040 that is based on public key 1000.

Computer system 440 receives and stores unique binary code 1040 into memory 450. When the time comes to execute unique binary code 1040, processor 300 uses private key 1020 in customized instruction decoder 620 to generate output instruction control signals.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system comprising a processor and a memory accessible by the processor, the method comprising:
   loading a set of encrypted binary code into the processor, wherein the set of encrypted binary code has been encrypted based upon a unique key of the processor;
   transforming, by an instruction decoder included in the processor, the set of encrypted binary code into a set of instruction control signals using the unique key, wherein the transforming further comprises:
      inputting the unique key and the set of encrypted binary code into combinatorial logic circuitry included in the instruction decoder, wherein the combinatorial logic applies the unique key directly to the set of encrypted binary code to transform, in a single clock cycle, a single one encrypted binary code instruction from the set of encrypted binary code to a first one of the set of instruction control signals; and
   executing, by the processor, a set of instructions based on the set of instruction control signals.

2. The method of claim 1 further comprising:
   prohibiting unencrypted native binary code corresponding to the encrypted binary code from being stored in the memory, wherein the unencrypted native binary code comprises at least one native binary code instruction that is executable by a different processor.

3. The method of claim 1 further comprising:
   generating an address based on a combination of the set of encrypted binary code and the unique key;
   accessing a read-only memory using the generated address to retrieve a memory value; and
   using the memory value as the set of instruction control signals.

4. The method of claim 1 wherein, prior to loading the set of encrypted binary code into the processor, the method further comprises:
   retrieving the unique key from a physically unclonable function embedded in the processor;
   in response to retrieving the unique key, inhibiting the processor from providing the unique key to an external entity; and
   sending the unique key and a processor identifier corresponding to the processor to a software manufacturer.

5. The method of claim 4 further comprising:
   sending a request comprising the processor identifier and devoid of the unique key from the information handling system to the software manufacturer; and
   receiving the set of encrypted binary code from the software manufacturer, wherein the software manufacturer assembled common assembly code using the unique key to create the set of encrypted binary code.

6. A system comprising:
   a processor;
   a memory that stores a set of encrypted binary code that is encrypted based on a unique key that is specific to the processor; and
   an instruction decoder in the processor that applies the unique key to the set of encrypted binary code to generate a set of instruction control signals executable by the processor, wherein the instruction decoder comprises logic circuitry that receives the unique key and the set of encrypted binary code as a set of inputs, and applies the unique key directly to the set of encrypted binary code to transform, in a single clock cycle, a single one encrypted binary code instruction from the set of encrypted binary code to a first one of the set of instruction control signals.

7. The system of claim 6 further comprising:
the processor that prohibits unencrypted native binary code corresponding to the encrypted binary code from being stored in the memory, wherein the unencrypted native binary code comprises at least one native binary code instruction that is executable by a different processor.

8. The system of claim 6 wherein instruction decoder further comprises:
additional logic that generates an address based on a combination of the set of encrypted binary code and the unique key;
a register that latches the generated address;
memory logic that accesses a read only memory based on the generated address and retrieves a memory value; and
control logic that uses the memory value as the set of instruction control signals.

9. The system of claim 6 wherein the system further comprises:
a physically unclonable function that generates the unique key;
a fuse that inhibits the unique key from being accessed external to the processor.

10. An information handling system comprising:
one or more processors;
a memory coupled to at least one of the processors;
a set of computer program instructions stored in the memory and executed by at least one of the processors in order to perform actions of:
loading a set of encrypted binary code into the processor, wherein the set of encrypted binary code has been encrypted based upon a unique key of the processor;
transforming, by an instruction decoder included in the processor, the set of encrypted binary code into a set of instruction control signals using the unique key, wherein the transforming further comprises:
inputting the unique key and the set of encrypted binary code into combinatorial logic circuitry included in the instruction decoder, wherein the combinatorial logic applies the unique key directly to the set of encrypted binary code to transform, in a single clock cycle, a single one encrypted binary code instruction from the set of encrypted binary code to a first one of the set of instruction control signals; and
executing, by the processor, a set of instructions based on the set of instruction control signals.

11. The information handling system of claim 10 wherein the processors perform additional actions comprising:
prohibiting unencrypted native binary code corresponding to the encrypted binary code from being stored in the memory, wherein the unencrypted native binary code comprises at least one native binary code instruction that is executable by a different one of the processors.

12. The information handling system of claim 10 wherein the processors perform additional actions comprising:
generating an address based on a combination of the set of encrypted binary code and the unique key;
accessing an internal memory using the generated address to retrieve a memory value; and
using the memory value as the set of instruction control signals.

13. The information handling system of claim 10 wherein the processors perform additional actions comprising:
retrieving the unique key from a physically unclonable function embedded in the processor;
in response to retrieving the unique key, inhibiting the processor from providing the unique key to an external entity; and
sending the unique key and a processor identifier corresponding to the processor to a software manufacturer.

14. The information handling system of claim 13 wherein the processors perform additional actions comprising:
sending a request comprising the processor identifier and devoid of the unique key from the information handling system to the software manufacturer; and
receiving the set of encrypted binary code from the software manufacturer, wherein the software manufacturer assembled common assembly code using the unique key to create the set of encrypted binary code.

* * * * *